US011468876B2

(12) United States Patent
Hashida et al.

(10) Patent No.: US 11,468,876 B2
(45) Date of Patent: Oct. 11, 2022

(54) ACOUSTIC MATCHING LAYER

(71) Applicant: Panasonic Intellectual Property Management Co., Ltd., Osaka (JP)

(72) Inventors: Masamichi Hashida, Shiga (JP); Tomoki Masuda, Osaka (JP); Hidetaka Sugaya, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 16/618,135

(22) PCT Filed: Jun. 21, 2018

(86) PCT No.: PCT/JP2018/023563
§ 371 (c)(1),
(2) Date: Nov. 28, 2019

(87) PCT Pub. No.: WO2019/004037
PCT Pub. Date: Jan. 3, 2019

(65) Prior Publication Data
US 2020/0175957 A1 Jun. 4, 2020

(30) Foreign Application Priority Data
Jun. 30, 2017 (JP) ............................ JP2017-128357

(51) Int. Cl.
*G10K 11/18* (2006.01)
*G01N 29/28* (2006.01)
*G10K 13/00* (2006.01)

(52) U.S. Cl.
CPC .............. *G10K 11/18* (2013.01); *G10K 13/00* (2013.01)

(58) Field of Classification Search
CPC .. H04R 17/00; H04R 1/00; A61B 8/00; G01F 1/66; G10K 11/18; G10K 11/02; G10K 13/00; G01N 29/28
See application file for complete search history.

(56) References Cited

U.S. PATENT DOCUMENTS 3,370,186 A * 2/1968 Antonevich .......... G10K 11/02 310/325
2004/0113522 A1* 6/2004 Nagahara ............... G01F 1/662 310/326
(Continued)

FOREIGN PATENT DOCUMENTS

CN 103371850 A * 10/2013 ............... A61B 8/14
EP 1 416 255 5/2004
(Continued)

OTHER PUBLICATIONS

Extended European Search Report dated Jun. 22, 2020 in corresponding European Patent Application No. 18825052.6.
(Continued)

*Primary Examiner* — Edgardo San Martin
(74) *Attorney, Agent, or Firm* — Wenderoth, Lind & Ponack, L.L.P.

(57) ABSTRACT

An acoustic matching layer includes a base material having a plate-shaped member made of a metal, a ceramic, or glass. Depressed portions are partially provided in a vibration surface of the base material toward a joining surface of the base material that is in a propagation direction of a sound wave.

9 Claims, 6 Drawing Sheets

(56) References Cited

U.S. PATENT DOCUMENTS

| | | | | |
|---|---|---|---|---|
| 2012/0271202 | A1 | 10/2012 | Wisdom | |
| 2013/0301394 | A1 | 11/2013 | Chen et al. | |
| 2017/0172543 | A1 | 6/2017 | Sato | |
| 2020/0253584 | A1 * | 8/2020 | Morimoto | G01S 15/8915 |

FOREIGN PATENT DOCUMENTS

| | | | | | |
|---|---|---|---|---|---|
| EP | 3708264 | A1 | * | 9/2020 | B06B 1/0622 |
| JP | 7-037107 | U | | 7/1995 | |
| JP | 2000-139916 | | | 5/2000 | |
| JP | 2004-219248 | | | 8/2004 | |
| JP | 2012257017 | A | * | 12/2012 | A61B 8/4494 |
| JP | WO2020174640 | A1 | * | 3/2021 | G01S 7/521 |
| WO | WO-2012102394 | A1 | * | 8/2012 | B06B 1/0629 |
| WO | 2016/038926 | | | 3/2016 | |
| WO | WO-2018070159 | A1 | * | 4/2018 | A61B 8/4444 |

OTHER PUBLICATIONS

International Search Report of PCT application No. PCT/JP2018/023563 dated Aug. 14, 2018.

* cited by examiner

ACOUSTIC MATCHING LAYER

CROSS-REFERENCE TO RELATED APPLICATIONS

This application is a U.S. national stage application of the PCT International Application No. PCT/JP2018/023563 filed on Jun. 21, 2018, which claims the benefit of foreign priority of Japanese patent application No. 2017-128357 filed on Jun. 30, 2017, the contents all of which are incorporated herein by reference.

TECHNICAL FIELD

The present invention relates to an acoustic matching layer high mainly in sensitivity of transmission and reception of an ultrasonic wave, mechanical strength, and heat resistance.

BACKGROUND ART

Generally, energy transmission efficiency (of an ultrasonic wave) from an ultrasonic wave generation source to a gas such as air or the like becomes higher, as acoustic impedances (each of which is the product of a density of each substance and a sound velocity) of the ultrasonic wave generation source and the gas become closer.

However, the ultrasonic wave generation source is generally configured of a ceramic (high in density and sound velocity), and a density and a sound velocity of a gas such as air or the like to transmit an ultrasonic wave are largely smaller than the density and the sound velocity of the ceramic. Accordingly, the energy transmission efficiency from the ultrasonic wave generation source to air is very low. In order to solve this problem, a countermeasure for increasing the energy transmission efficiency has been taken, that an acoustic matching layer having a smaller acoustic impedance than that of the ultrasonic wave generation source, and having a larger acoustic impedance than that of air is interposed between the ultrasonic wave generation source and the gas.

In order to reduce the acoustic impedance of the acoustic matching layer, a substance configuring the acoustic matching layer is made porous to reduce a density (and a sound velocity).

However, there has been a problem that, since making the substance porous decreases a mechanical strength of the substance, handling as an industrial product becomes difficult. Consequently, for the acoustic matching layer, it has been attempted that, by combining a member of a sufficiently small density (sufficiently small acoustic impedance), and an insufficient mechanical strength, and a member having a low reduction degree of the density, and a high mechanical strength, both the reduction of the acoustic impedance, and maintenance or increase of the mechanical strength are satisfied (e.g., refer to Unexamined Japanese Patent Publication No. 2004-219248).

CITATION LIST

Patent Literature

PTL 1: Unexamined Japanese Patent Publication No. 2004-219248

SUMMARY OF THE INVENTION

However, the method for measuring the density according to conventional Unexamined Japanese Patent Publication No. 2004-219248 has had a problem with handling as an industrial product, such as a problem that man-hours are increased, because at least a member having a high density and a member having a small density need to be combined.

Furthermore, there has been a problem with the handling as the industrial product, for example, that in order to match phases of sound waves emitted from the member having the high density and the member having the small density, thicknesses of the members need to be adjusted with high accuracy, and the man-hours are increased.

An acoustic matching layer of the present invention includes: a base material having a plate shape, and including a joining surface and a vibration surface which are opposite surfaces of the base material having a predetermined thickness, the joining surface being joined to an ultrasonic wave generation source, and the vibration surface emitting a sound wave; and portions partially provided in at least the vibration surface, the portions being depressed or penetrating toward the joining surface.

Physical interpretation regarding the above-described acoustic matching layer will be described below.

Firstly, the product of a density and a sound velocity as a definition of an acoustic impedance indicates a momentum of a substance configuring a fine unit element of the substance. That is, if the momentum of the substance configuring the fine unit element is ΔP, a mass is ΔM, and a velocity is V, from a definition of the momentum, the following expression is established.

$$\Delta P \text{ (momentum)} = \Delta M \times V \text{ (acoustic impedance)}$$

Thus, it is found that the acoustic impedance is the momentum of the substance configuring the fine unit element.

Accordingly, it is found that for efficient energy propagation from a certain substance (ultrasonic wave generation source) to an adjacent substance, it is desirable that the acoustic impedances of these substances are close.

Based on the foregoing, a phenomenon occurring in the above-described acoustic matching layer will be described.

Generally, the sound velocity of a substance is expressed by the following expression.

$$V = (k/\rho)^{1/2}$$

where k is a bulk modulus, and ρ is a density. That is, it is found that since the sound velocity of the substance is uniquely decided by the bulk modulus and the density, it is difficult to intendedly control the sound velocity.

Accordingly, in order to reduce the acoustic impedance, it is effective to reduce the density. In the acoustic matching layer of the present invention, a method for partially providing the depressed portions or the penetrating portions to reduce an apparent density is employed.

On the other hand, when introducing clearances to the substance, the density is reduced, and there is a concern about energy loss due to hindrance of the propagation of the sound wave. In order to avoid this, a fact that the sound wave is a longitudinal wave is focused on, and the dense portion (the portion where the depressed portions or the penetrating portions are not provided) plays a role in the transmission of the sound wave along a propagation direction of the sound wave.

When the surface having the depressed portions or the penetrating portions is in contact with the gas, a phenomenon when the sound wave propagated in the dense portion is propagated to the gas is as follows.

While exchange of the momentum is performed between the dense portion and an interface of the gas, when both are compared in fine volume element, the acoustic impedance of the former is remarkably larger, and thus, efficient exchange of the momentum is not performed only in these portions. However, giving the momentum to the fine volume element of the gas by the dense portion results in giving the momentum to the gas around the fine volume element as well mainly due to a viscous property of the gas. That is, the momentum is also given to a part of the gas existing in interfaces of the depressed portions or the penetrating portions of the acoustic matching layer (near the dense portion). Accordingly, a phenomenon equivalent to a phenomenon that the density of the gas simulatively rises (the density of the acoustic matching layer is decreased and the acoustic impedance is decreased) can be obtained.

Accordingly, in order to more efficiently give the momentum to the gas in the depressed portions or the penetrating portions, a shorter pitch cycle of the dense portion, and the depressed portions or the penetrating portions is advantageous. If a scale of the pitch cycle is sufficiently smaller than a wavelength of the ultrasonic wave, and mostly about 1/10, an effect equivalent to an effect of a substance having a density that is the product of the density of the dense portion and an abundance ratio can be obtained.

According to the present invention, a resin, a metal, a ceramic or the like having high density, which is disadvantage substance as the acoustic matching layer because of large acoustic impedance in view of bulk, can be used as the acoustic matching layer. Accordingly, even in cases where application of a resin conventionally used is difficult under high temperature circumstances, high pressure circumstances, or the like, the present invention can be applied.

DESCRIPTION OF EMBODIMENTS

Hereinafter, exemplary embodiments of the present invention will be described with reference to the drawings. It is to be noted that the present invention is not limited to these exemplary embodiments.

First Exemplary Embodiment

Figure 1A:
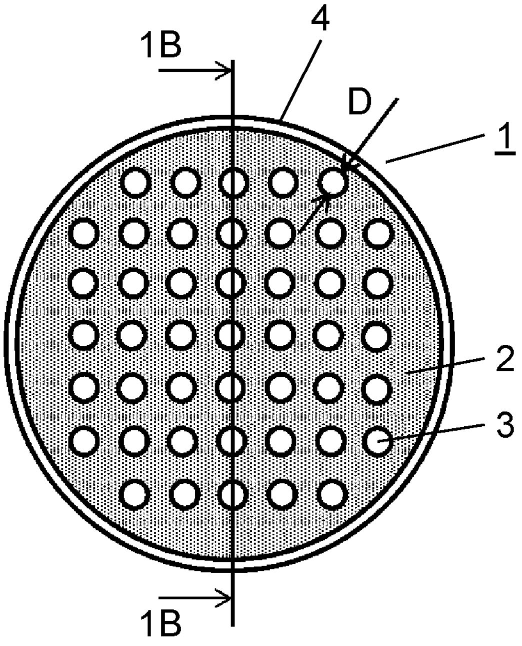
FIG. 1A is a schematic plan view showing a state where an acoustic matching layer in a first exemplary embodiment is joined to an ultrasonic wave generation source.
Figure 1B:
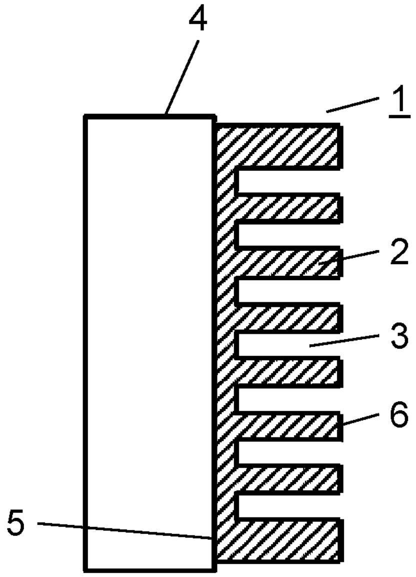
FIG. 1B is a cross-sectional view along 1B-1B in FIG. 1A.
Figure 2:
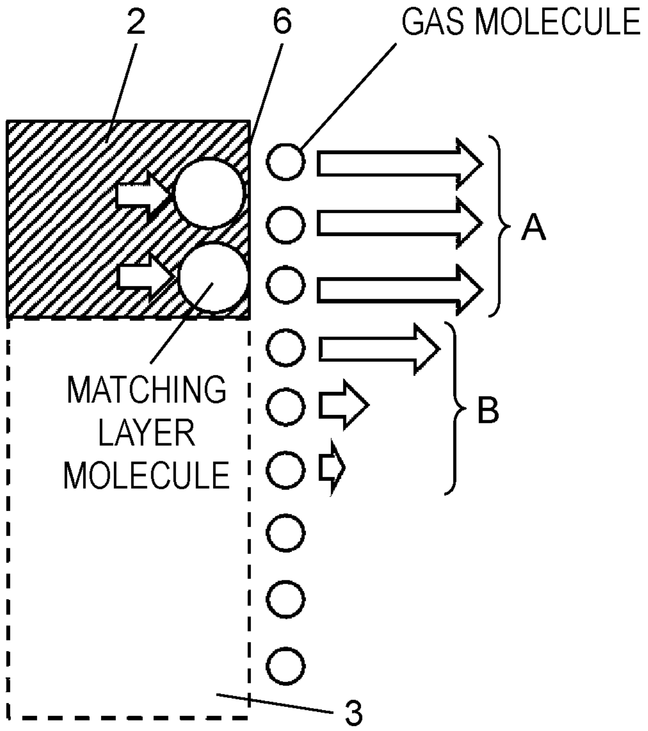
FIG. 2 is a schematic view showing momentum exchange of the acoustic matching layer in the first exemplary embodiment.

FIG. 1A is a schematic plan view showing a state where an acoustic matching layer in a first exemplary embodiment of the present invention is joined to an ultrasonic wave generation source. FIG. 1B is a cross-sectional view along 1B-1B of FIG. 1A, and FIG. 2 is a schematic view showing momentum exchange in the first exemplary embodiment of the present invention. In FIGS. 1A, 1B, acoustic matching layer 1 includes dense portion 2 and depressed portions 3 each having a cylindrical shape, using a plate-shaped material made of polyether ether ketone (PEEK) resin as a base material. A plurality of depressed portions 3 exist in an entire surface on a side of one surface of the plate-shaped material that comes into contact with a gas, and ultrasonic wave generation source 4 is joined to a side of a surface where the depressed portions do not exist (hereinafter, referred to as joining surface 5). Here, diameter D of each of depressed portions 3 is about 1/20 of a wavelength of an ultrasonic wave generated from ultrasonic wave generation source 4.

Hereinafter, operation of acoustic matching layer 1 will be described with reference to FIGS. 1A, 1B, and 2.

Ultrasonic wave generation source 4 and joining surface 5 are joined by an epoxy-based adhesive, and vibration surface 6 (surface in contact with the gas) vibrates vertically in a surface direction (in a right-left direction in the figure). At this time, in vibration surface 6 and joining surface 5, exchange of momentum is performed as follows.

Firstly, since joining surface 5 is joined to ultrasonic wave generation source 4, joining surface 5 is given a momentum by vibration of ultrasonic wave generation source 4.

Next, the momentum propagated to joining surface 5 is propagated from joining surface 5 to matching layer molecules of vibration surface 6 by a coaction of a substance configuring dense portion 2 (atoms and molecules).

Furthermore, a mechanism of the momentum exchange with the gas in non-direct contact with the substance configuring dense portion 2 will be described.

Firstly, the gas in contact with vibration surface 6 of dense portion 2 is subjected to the exchange of the momentum, and a large momentum (indicated by arrow A in FIG. 2) is given gas molecules in contact with vibration surface 6. However, since the acoustic impedance of dense portion 2 is remarkably larger than the acoustic impedance of the gas, effective exchange of the momentum only in this portion is not performed. That is, if there is no coaction between the gas molecules, a large surplus exists in the momentum in the dense portion.

Here, in a surface including the portion where dense portion 2 and the gas come into contact, the momentum (arrow B) is applied to the gas existing in the portions corresponding to depressed portions 3 by viscous property of the gas. That is, the gas given the momentum by the contact with dense portion 2 propagates the momentum, by the viscous property, to the gas existing near the surface including the portion where dense portion 2 and the gas come into contact with each other. The above-described phenomenon enables dense portion 2 to give the momentum to a part of the gas existing in depressed portions 3 (vicinity of the same surface), and this relatively increases the density of the gas, and corresponds to a decrease of a difference in the acoustic impedance. However, a case where the above-described phenomenon is effective is limited to a vicinity of dense portion 2 in the surface including the portion where dense portion 2 and the gas come into contact with each other.

On the other hand, as a scale of each of the depressed portions becomes smaller, the momentum of dense portion 2 is more effectively transmitted. Generally, in a wave phenomenon, even if there is a disturbing factor sufficiently small, that is, about 1/10 or less of a wavelength, the disturbing factor does not have a large influence on the propagation of the wave. Accordingly, since the diameter of depressed portion 3 (disturbing factor to the propagation of the ultrasonic wave in dense portion 2) is about 1/20 of the wavelength, the propagation of the ultrasonic wave is not hindered, and excellent characteristics can be obtained.

Figure 3A:
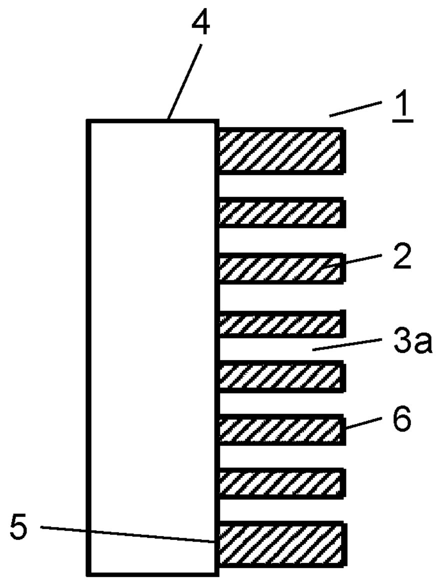
FIG. 3A is a cross-sectional view showing another example of the acoustic matching layer in the first exemplary embodiment.
Figure 3B:
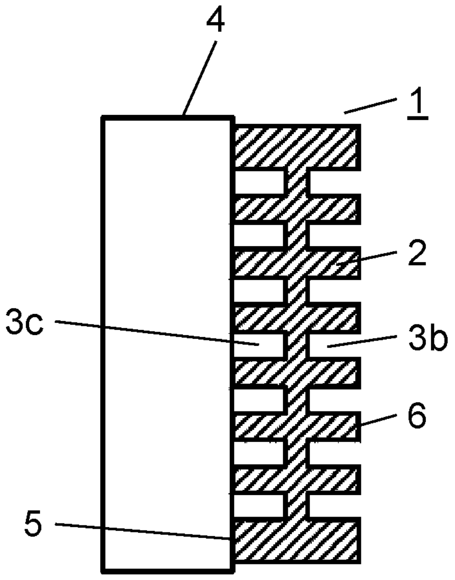
FIG. 3B is a cross-sectional view showing another example of the acoustic matching layer in the first exemplary embodiment.

While in the present exemplary embodiment, depressed portions 3 each having a circular shape with a bottom only in the one surface of the plate-shaped material, and depressed portions 3 do not exist in the other surface, both the surfaces may have depressed portions. That is, a cross-sectional shape along 1B-1B in FIG. 1A may be a shape where the depressed portions in the cylindrical shape are each trough hole 3*a* (penetrating portion) penetrating the plate-shaped material, as shown in FIG. 3A, or may be a shape where depressed portions 3*b*, 3*c* each having a cylindrical shape with a bottom are provided in both the surfaces of the plate-shaped material, as shown in FIG. 3B.

Here, the plate-shaped material is a material having a characteristic that a scale in one-dimensional direction is remarkably smaller than scales in the other two-dimensional directions of three-dimensional directions.

Figure 4A:
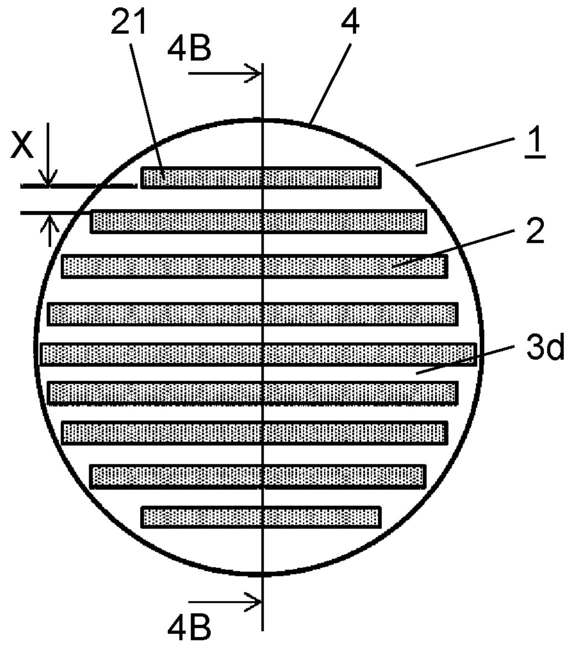
FIG. 4A is a schematic plan view showing a state where another example of the acoustic matching layer in the first exemplary embodiment is joined to the ultrasonic wave generation source.
Figure 4B:
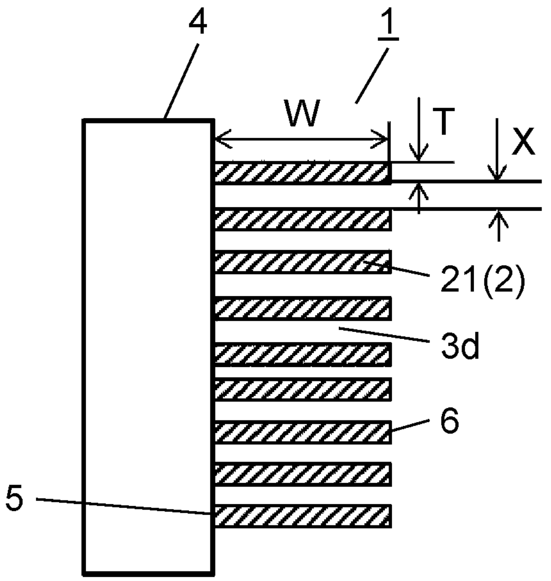
FIG. 4B is a cross-sectional view along 4B-4B in FIG. 4A.

Furthermore, while in the present exemplary embodiment, the acoustic matching layer is formed by providing the depressed portions in the plate-shaped material, the present exemplary embodiment is not limited to this method. As shown in FIGS. 4A, 4B, many sheet-shaped materials 21 each having a width W and a thickness T are disposed on ultrasonic wave generation source 4 at intervals X so that a surface direction of each of sheet-shaped materials 21 is substantially parallel to a propagation direction of a sound wave. This may allow penetrating portions 3*d* to be configured, and sheet-shaped materials 21 may be disposed so that aligning end surfaces of sheet-shaped materials 21 makes up vibration surface 6, and acoustic matching layer 1 may be formed. In this case, each of sheet-shaped materials 21 functions as dense portion 2.

Figure 5A:
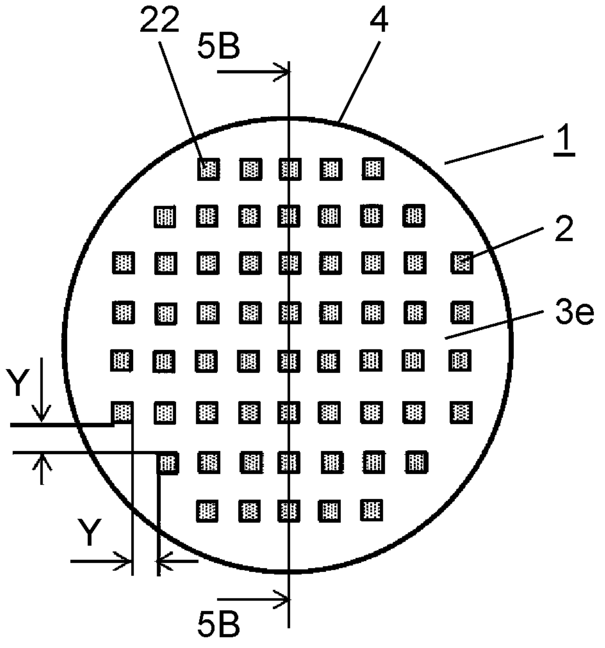
FIG. 5A is a schematic plan view showing a state where another example of the acoustic matching layer in the first exemplary embodiment is joined to the ultrasonic wave generation source.
Figure 5B:
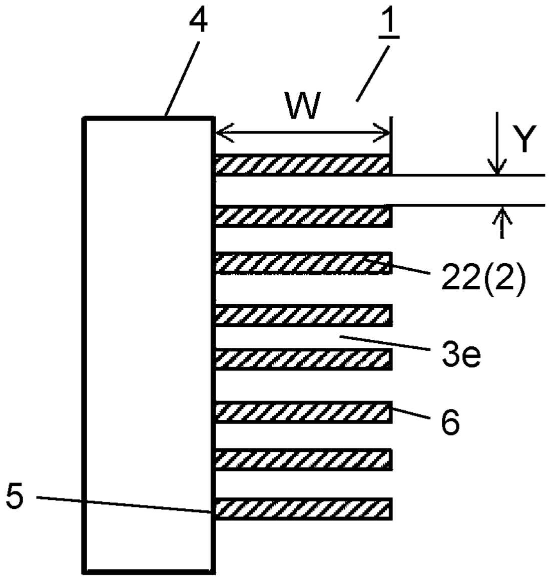
FIG. 5B is a cross-sectional along 5B-5B in FIG. 5A.

Moreover, as shown in FIGS. 5A, 5B, rod-shaped materials 22 each having a quadrangular cross section and a length W may be used. Many rod-shaped materials 22 may be disposed at intervals Y on ultrasonic wave generation source 4 so that a length direction is substantially parallel to the propagation direction of the sound wave to configure penetrating portions 3*e*, and may be disposed so that one-ends of rod-shaped materials 22 make up vibration surface 6 to thereby form acoustic matching layer 1. In this case, each of rod-shaped materials 22 functions as dense portion 2. The cross-sectional shape of each of rod-shaped materials 22 is not limited to the quadrangular shape shown in the figure, but may be a polygonal or circular shape other that a quadrangular shape.

Here, the scale denotes a size that characterizes the dense portion, and the depressed portion or the penetrating portion, and in the case where the shape of the depressed portion or the penetrating portion along the vibration surface is circular, the scale denotes a diameter of the circle. As long as the shape of the depressed portion or the penetrating portion along the vibration surface is an independent shape, even if it is square, rectangular, or indeterminate, the scale denotes a diameter of a circle having the same area as an area of the foregoing shape, that is, a so-called equivalent diameter. Furthermore, in the case where the shape of the depressed portion or the penetrating portion along the vibration portion is a shape having one remarkably long side, the scale denotes a distance of a short side. Alternatively, in the case where the shape of the depressed portion or the penetrating portion is not surrounded as shown in FIGS. 4A, 4B, 5A, 5B, interval X or interval Y corresponds to the scale.

Moreover, the sheet-shaped material is a material having a scale in one-dimensional direction remarkably smaller than scales in the other two-dimensional directions in three-dimensional directions, and a ratio of the scale in the one-dimensional direction is remarkable even in comparison with the plate-shaped material.

Moreover, the base material configuring dense portion 2 is not limited to PEEK, but may be another resin such as nylon, acryl, polycarbonate or the like, and in the case of another resin, a harder resin has a higher acoustic transmission efficiency, and thus, the acoustic matching layer having excellent characteristics can be obtained. Furthermore, the base material is not limited to a resin, but may be a ceramic, a metal or the like, and a material that is excellent in acoustic propagation efficiency while reducing acoustic impedance is desirable.

While in the present exemplary embodiment, polyether ether ketone (PEEK) resin is used as the material of acoustic matching layer 1, a stainless steel may be used, and acoustic matching layer 1 may be configured of dense portion 2, depressed portions 3, 3*b*, 3*c* each having a cylindrical shape, or penetrating portions 3*a*, 3*d*, 3*e* made of a stainless steel.

Generally, the sound velocity of PEEK resin is about 2500 m/s, the sound velocity of a stainless steel is about 6000 m/s, so that a ratio of them is about 2.4. Furthermore, since the wavelength of the ultrasonic wave is proportional to the sound velocity, a thickness of ¼ of the wavelength, which is a condition that results in the most excellent characteristics, becomes about 2.4 times. Further, since the wavelength of the ultrasonic wave becomes longer, the scale of the depressed portion or penetrating portion can be considerably large, so that molding of the matching layer becomes easy. Further, because of a stainless steel, it can be used at a higher temperature.

Moreover, as the material of acoustic matching layer 1, glass or a ceramic can be used, and acoustic matching layer 1 may be configured of dense portion 2, depressed portions 3, 3*b*, 3*c* each having a cylindrical shape, or penetrating portions 3*a*, 3*d*, 3*e* made of glass or a ceramic.

Since the sound velocity of glass is 5000 m/s, and is larger than the sound velocity of PEEK, the fact is equivalent to the case of the stainless steel, that the thickness resulting in the most excellent characteristics of the matching layer, and the scale of the depressed portions or the penetrating portions is different.

Further, since acoustic matching layer 1 is made of glass or a ceramic, acoustic matching layer 1 that has less influence and excellent durability even in an oxidation atmosphere can be obtained.

Second Exemplary Embodiment

Figure 6A:
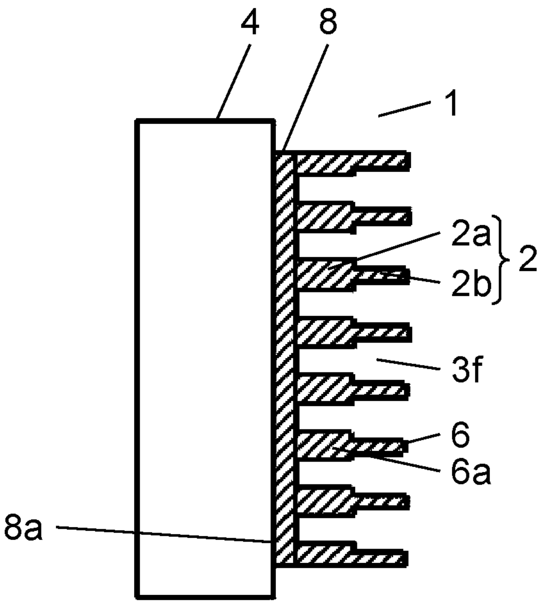
FIG. 6A is a schematic cross-sectional view showing a state where an acoustic matching layer in a second exemplary embodiment is joined to an ultrasonic wave generation source.
Figure 6B:
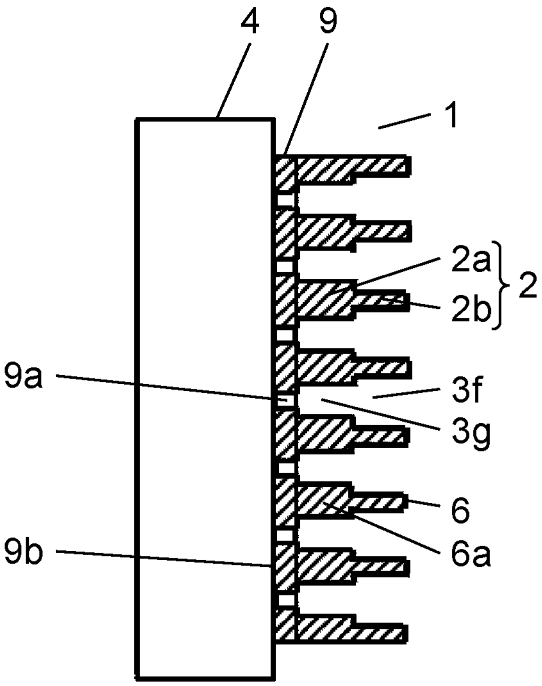
FIG. 6B is a schematic cross-sectional view showing a state where an acoustic matching layer in the second exemplary embodiment is joined to the ultrasonic wave generation source.
Figure 7:
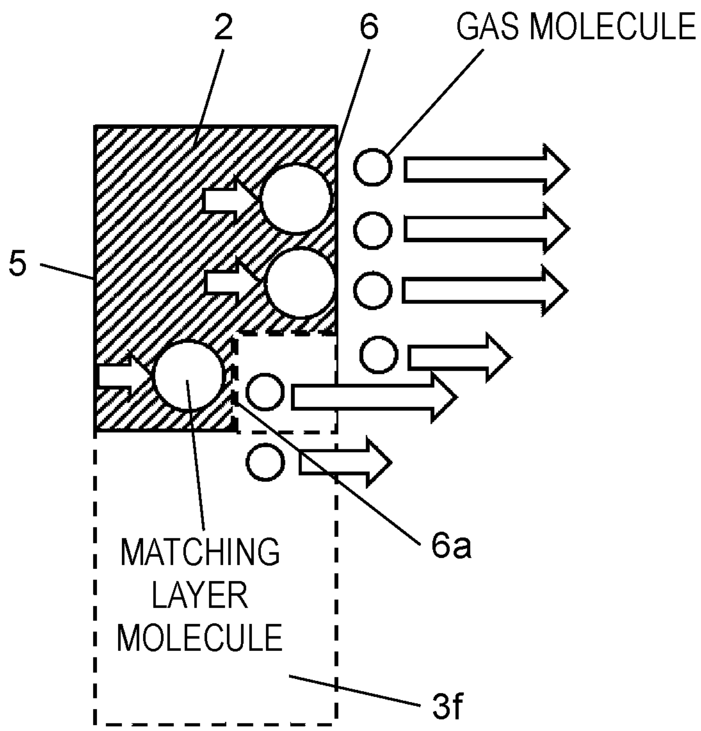
FIG. 7 is a schematic view showing momentum exchange of the acoustic matching layer in the second exemplary embodiment.

FIGS. 6A, 6B are each a schematic cross-sectional view of an acoustic matching layer in a second exemplary embodiment of the present invention, and FIG. 7 is a schematic view of momentum exchange in the second exemplary embodiment of the present invention.

In FIGS. 6A, 6B, acoustic matching layer 1 includes dense portion 2 and depressed portions 3*f* made of polyether ether ketone (PEEK) resin. Here, dense portion 2 has a circular columnar shape continuously disposed so that a section near ultrasonic wave generation source 4 is thickest, and a section near a gas is thinnest, both sections being continuously disposed, and in the present exemplary embodiment, dense portion 2 is configured in two steps of thick circular columnar portion 2*a* and thin circular columnar portion 2*b*. Furthermore, in order to make handling easy, a surface on a side of ultrasonic wave generation source 4 is joined to PEEK resin having a sheet shape. PEEK resin 8 having a sheet shape as shown in FIG. 6A is uniform, and in PEEK resin 9 having a sheet shape shown in FIG. 6B, through holes 9*a* each having a smaller cross-sectional area than a cross-sectional area of bottom portion 3*g* of each depressed portions 3*f* formed between dense portions 2 is opened along the propagation direction of the ultrasonic wave.

Vibration surface 6 also exists at a step portion between the circular columns having different thicknesses, and an area of vibration surface 6 is a sum of an area of a portion that is not occupied by thin circular columnar portion 2*b* and an area of a surface on a gas side of the thinnest circular column, and is equal to a cross-sectional area of thickest circular columnar portion 2*a*.

Hereinafter, operation of acoustic matching layer 1 regarding the present exemplary embodiment will be described with reference to FIG. 7.

In FIG. 6A, acoustic matching layer 1 is joined to ultrasonic wave generation source 4 at joining surface 8*a* by an epoxy-based adhesive, and vibration surface 6 comes into contact with the gas and vibrates vertically (in a right-left direction in the figure).

In FIG. 6B, acoustic matching layer 1 is joined to ultrasonic wave generation source 4 at joining surfaces 9*b,* which are most thickest portions, by an epoxy-based adhesive, and vibration surface 6 comes into contact with the gas and vibrates vertically (in a right-left direction in the figure).

In ultrasonic wave generation source 4 and joining surface 8*a* in FIG. 6A, and ultrasonic wave generation source 4 and joining surfaces 9*b,* which are the most thickest portions of dense portions 2 in FIG. 6B, exchange of the momentum is performed as follows.

Here, since the area of vibration surface 6 is equivalent to the cross-sectional area of thickest circular column 2*a,* the momentum exchange thereof is equivalent to that in a case where vibration surface 6 is formed of only the thickest circular column.

Furthermore, if dense portion 2 has only thickest circular column 2*a,* the exchange of the momentum to the gas existing in a portion corresponding to each of depressed portions 3*f* in a surface including a portion where dense portion 2 and the gas come into contact with each other by the viscous property of the gas is performed only near a circumferential portion of dense portion 2. In contrast, as in the present exemplary embodiment, since dense portion 2 has the circular columnar shape so that the section near ultrasonic wave generation source 4 is thickest, and the section near the gas is thinnest, both the sections being continuously disposed, the exchange of the momentum occurs near the circumferential portions of vibration surfaces 6, 6*a* of the circular columns having the respective thicknesses, and thus, effective exchange of the momentum is performed.

Here, in order to mutually strengthen the sound waves generated in the respective vibration surfaces in surfaces including a surface of thinnest circular column 2*b,* it is desirable that a length of each of circular columns 2*a,* 2*b* is an integral multiple of ¼ of the wavelength of the sound wave propagated in the gas.

Note that in acoustic matching layer 1 shown in FIG. 6A of the present exemplary embodiment, since joining surface 8*a* on the side of ultrasonic wave generation source 4 is joined by the PEEK resin having a sheet shape, handleability of the matching layer is enhanced.

Moreover, when ultrasonic wave generation source 4 is made of a material having a very large acoustic impedance, such as a metal, a ceramic, or the like, a difference in the acoustic impedance from acoustic matching layer 1 provided with depressed portions 3*f* is remarkable, so that there is a possibility that the exchange of the momentum is not efficiently performed. However, a member (buffer) is inserted between ultrasonic wave generation source 4 and acoustic matching layer 1, the member having a smaller acoustic impedance (density) than that of ultrasonic wave generation source 4, and a larger acoustic impedance (density) than the portion made of each of the thickest circular columns. Consequently, first, the exchange of the momentum is efficiently performed between ultrasonic wave generation source 4 and the buffer, and next, the exchange of the momentum is efficiently performed between the buffer and the portion made of the thickest circular column. As a result, even if the difference in the acoustic impedance (density) between ultrasonic wave generation source 4 and the portion made of the thickest circular column is remarkable, the exchange of the momentum can be efficiently performed.

In acoustic matching layer 1 shown in FIG. 6B, since PEEK resin 9 having a sheet shape is formed with through holes 9*a,* the density becomes smaller than the PEEK resin. Furthermore, when an area lost by each of through holes 9*a* is smaller than an area of depressed portion 3*g* between thickest portions of dense portion 2, the density becomes larger than that of the thickest portion. Accordingly, a condition of a smaller density than the density of ultrasonic wave generation source 4 and a larger density than the density of the thickest portion is satisfied, so that an effect as the buffer exerts, and a more effective acoustic matching layer can be obtained.

Accordingly, in acoustic matching layer 1 shown in FIG. 6B, since through holes 9*a* are formed in the PEEK resin having a sheet shape, the exchange of the momentum is more efficiently performed than acoustic matching layer 1 shown in FIG. 6A.

Note that while in the present exemplary embodiment, dense portion 2 is configured of two circular columns 2*a,* 2*b* different in diameter, by forming each of the depressed portions in the first exemplary embodiment into two cylindrical shapes different in diameter, a similar effect can be obtained.

Third Exemplary Embodiment

Figure 8:
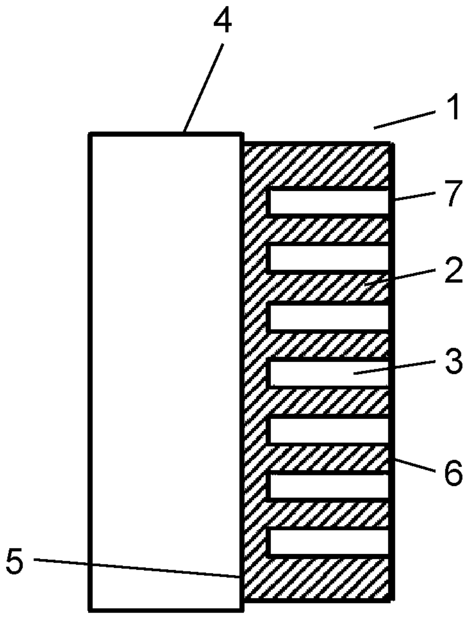
FIG. 8 is a schematic cross-sectional view showing a state where an acoustic matching layer in a third exemplary embodiment is joined to an ultrasonic wave generation source.
Figure 9:
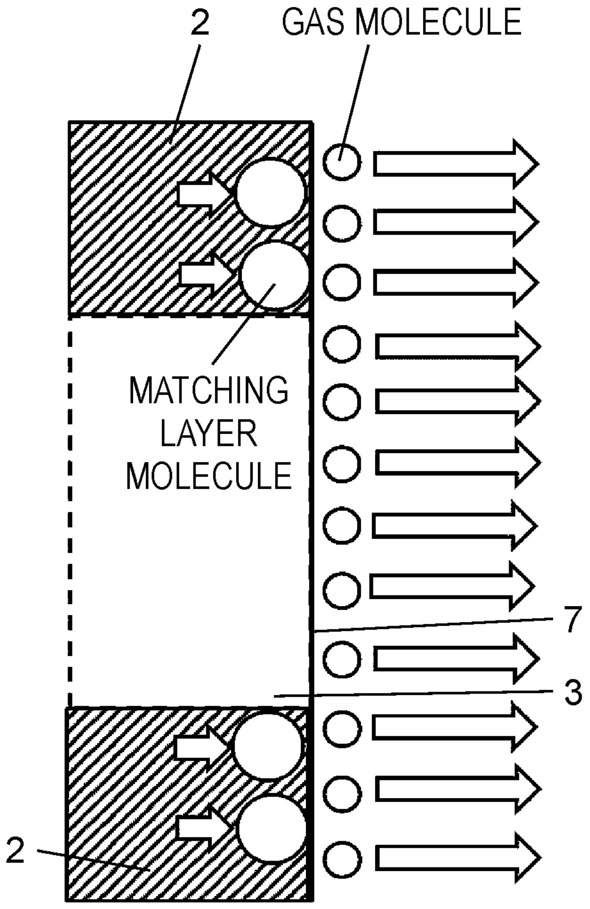
FIG. 9 is a schematic view showing momentum exchange of the acoustic matching layer in the third exemplary embodiment.

FIG. 8 is a schematic cross-sectional view of a state where an acoustic matching layer in a third exemplary embodiment of the present invention is jointed to an ultrasonic wave generation source, and FIG. 9 is a schematic view of momentum exchange in the third exemplary embodiment of the present invention.

In FIG. 8, acoustic matching layer 1 includes dense portion 2 and depressed portions 3 each having a cylindrical shape and, using a plate-shaped material made of polyether ether ketone (PEEK) resin as a base material. Depressed portions 3 exist in an entire surface on a side of one surface of the plate-shaped material that comes into contact with a gas, and ultrasonic wave generation source 4 is joined to a side of a surface where depressed portions 3 do not exist (hereinafter, referred to as joining surface 5). Here, a diameter of each of depressed portions 3 is about 1/20 of a wavelength of an ultrasonic wave generated from ultrasonic wave generation source 4. Furthermore, film-shaped material 7 made of polyether ether ketone (PEEK) resin is pasted to depressed portions 3.

Hereinafter, operation of acoustic matching layer 1 regarding the present exemplary embodiment will be described with reference to FIG. 9.

Ultrasonic wave generation source 4 and joining surface 5 are joined by an epoxy-based adhesive, and vibration surface 6 vibrates vertically (right-left direction in the figure) in a surface direction. At this time, between vibration surface 6 (the same surface as film-shaped material 7) and the gas, exchange of momentum is performed as follows.

First, while the gas in contact with dense portion 2 is subjected to the exchange of the momentum, since an acoustic impedance of dense portion 2 is remarkably larger than an acoustic impedance of the gas, effective exchange of the momentum only in this portion is not performed.

Here, a portion covering depressed portion 3 of film-shaped material 7 exchanges the momentum with the neighboring gas. At this time, since film-shaped material 7 is in contact with the gas, film-shaped material 7 can exchange the momentum even at a portion considerable distant from dense portion 2, and particularly, when a viscosity is small, this effect is remarkable.

EXAMPLES

Hereinafter, referring to examples, the present invention will be described in more detail. In the examples, as an evaluation index of characteristics of an acoustic matching layer, a pair of acoustic matching layers each joined to an piezoelectric element used as an ultrasonic wave generation source is installed separately by 100 mm, and an ultrasonic wave emitted from one of the ultrasonic wave generation sources is propagated to the piezoelectric element through the other acoustic matching layer to generate an electromotive force. Furthermore, this electromotive force is measured with an oscilloscope. Since the electromotive force is an increasing function of a propagation characteristic of the acoustic matching layer, the propagation characteristic of the acoustic matching layer is clarified from the electromotive force.

First Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 1.25 mm, and made of PEEK resin, depressed portions each having a cylindrical shape with a diameter 300 μm are disposed at intervals of 300 μm.

In the above-described case, the electromotive force was 40 mV.

Second Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 1.25 mm, and made of PEEK resin, depressed portions each having a cylindrical shape with a diameter 300 μm are disposed at intervals of 200 μm.

In the above-described case, the electromotive force was 50 mV.

In the second example, the electromotive force becomes larger than that in the first example. It is considered that this is because since the intervals of the depressed portions are small, an apparent density of the acoustic matching layer becomes smaller, and thereby, the acoustic impedance becomes small, so that the momentum exchange with air becomes easier.

Third Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 1.25 mm, and made of PEEK resin, depressed portions each having a cylindrical shape with a diameter 300 μm are disposed at intervals of 100 μm.

In the above-described case, the electromotive force was 60 mV.

The electromotive force becomes larger than that in the second example. It is considered that this is because since the intervals of the depressed portions are smaller, the apparent density of the acoustic matching layer further becomes smaller, and thereby, the acoustic impedance becomes smaller, so that the momentum exchange with air further becomes easier.

From the foregoing, it is considered that when the scales of the depressed portions are the same, existence of more depressed portions makes the apparent density smaller, and the acoustic impedance smaller, and thus, the exchange of the momentum is efficiently performed.

The phenomenon that the existence of the depressed portions makes the apparent density smaller appears more remarkably when the viscosity of the gas is large. That is, the gas that obtains the momentum by vibration in the dense portion of the acoustic matching layer propagates the momentum from a completely dense portion by the viscous property. As the viscosity of the gas becomes larger, the momentum can also be given to the gas more distant from the dense portion. Accordingly, the dense portion gives the momentum to more gas, and an effect equivalent to an effect that the difference in density between the relatively completely dense portion and the gas becomes small can be obtained.

Fourth Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness of 0.2 mm, and made of PEEK resin, each of the members having a shape where a circular column having a diameter of 1 mm and a length of 1.25 mm, and made of PEEK resin, and a circular column having a diameter of 0.5 mm and a length of 1.25 mm, and made of PEEK resin are joined with central axes thereof matched, and the members being arrayed and joined so that the portions having the diameter of 1 mm are densest.

In the above-described case, the electromotive force was 45 mV.

Fifth Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness of 0.2 mm, and made of PEEK resin, each of the members having a shape where a circular column having a diameter of 1 mm and a length of 2.5 mm, and made of PEEK resin, and a circular column having a diameter of 0.5 mm and a length of 2.5 mm, and made of PEEK resin are joined with central axes thereof matched, and the members being arrayed and joined so that the portions having the diameter of 1 mm are densest.

In the above-described case, the electromotive force was 43 mV.

Sixth Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness of 0.2 mm, and made of PEEK resin, each of the members having a shape where a circular column having a diameter of 1 mm and a length of 0.62 mm, and made of PEEK resin, and a circular column having a diameter of 0.5 mm and a length of 0.62 mm, and made of PEEK resin are joined with central axes thereof matched, and the members being arrayed and joined so that the portions having the diameter of 1 mm are densest.

In the above-described case, the electromotive force was 25 mV.

Seventh Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness 0.2 mm, and made of PEEK resin, each of the members having a shape where a circular column having a diameter of 1 mm and a length of 1.25 mm, and made of PEEK resin, and a circular column having a diameter of 0.5 mm and a length of 1.25 mm, and made of PEEK resin are joined with central axes thereof matched, and the acoustic matching layer being arrayed and joined so that the portions having the diameter of 1 mm are densest.

Here, in portions of the circular sheet made of PEEK resin that are not joined to the circular columns made of PEEK resin, through holes each having a diameter of 0.1 mm are provided at intervals of 0.1 mm.

In the above-described case, the electromotive force was 47 mV.

Eighth Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness of 0.2 mm, and made of PEEK resin, each of the members having a shape where a circular column having a diameter of 1 mm and a length of 2.5 mm, and made of PEEK resin, and a circular column having a diameter of 0.5 mm and a length of 2.5 mm, and made of PEEK resin are joined with central axes thereof matched, and the members being arrayed and joined so that the portions having the diameter of 1 mm are densest.

Here, in portions of the circular sheet made of PEEK resin that are not joined to the circular columns made of PEEK resin, through holes each having a diameter of 0.1 mm are provided at intervals of 0.1 mm.

In the above-described case, the electromotive force was 45 mV.

Ninth Example

In the second exemplary embodiment, evaluation of the electromotive force was performed as follows.

(1) An ultrasonic wave generation source has a circular shape with a diameter of 10 mm.

(2) An acoustic matching layer results from arraying and joining members on a circular sheet having a diameter of 10 mm and a thickness of 0.2 mm, and made of PEEK resin, each of the members having a shape where a circular column having a diameter of 1 mm and a length of 0.62 mm, and made of PEEK resin, and a circular column having a diameter of 0.5 mm and a length of 0.62 mm, and made of PEEK resin are joined with central axes thereof matched, and the members being arrayed and joined so that the portions having the diameter of 1 mm are densest.

Here, in portions of the circular sheet made of PEEK resin that are not joined to the circular columns made of PEEK resin, through holes each having a diameter of 0.1 mm are provided at intervals of 0.1 mm.

In the above-described case, the electromotive force was 27 mV.

In the acoustic matching layer of the fifth example, a distance where the ultrasonic wave is transmitted to the gas from the ultrasonic wave generation source becomes twice as long as that in the acoustic matching layer of the fourth example, while decrease in the electromotive force is slight.

In contrast to this, in the acoustic matching layer of the sixth example, the distance where the ultrasonic wave is transmitted to the gas from the ultrasonic wave generation source becomes shorter, that is, about 1/2 of that in the acoustic matching layer of the fourth example, while the electromotive force is decreased.

From the foregoing, it is found that in the fourth example and the fifth example, since a length of each of the circular columnar portions having the diameter of 1 mm, and each of the circular columnar portions having the diameter of 0.5 mm is ¼ of the wavelength of the ultrasonic wave propagated in PEEK resin, phases of the propagated ultrasonic waves are matched to thereby strengthen each other, and thus, the ultrasonic wave is efficiently propagated to the gas. This matches the fact that the sound velocity of PEEK resin is generally 2500 m/s. Furthermore, since even when the thickness of the acoustic matching layer is doubled, a decrease of an ultrasonic wave reaching distance is slight, it is found that PEEK resin is a material propagating the ultrasonic wave with high efficiency.

In contrast, in the sixth exemplary embodiment, though the acoustic matching layer is thinner, the electromotive force is smaller, and it is considered that this is because the length of each of the circular columnar portions having the diameter of 1 mm and the circular columnar portion having the diameter of 0.5 mm is under ¼ of the wavelength of the ultrasonic wave propagated in PEEK resin, so that the phases do not match each other.

When the fourth example and the seventh example are compared, the fifth example and the eighth example are compared, and the sixth example and the ninth example are compared, it is found that in any of the comparisons, the electromotive force becomes larger. This is because that since the PEEK resin having the sheet shape is formed with the through holes, a condition that the density thereof is smaller than that of the ultrasonic wave generation source and the ultrasonic wave generation source, and larger than the density of the thickest portions is satisfied, so that excellent characteristics can be obtained.

Tenth Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 2.9 mm, and made of SUS304, depressed portions each having a cylindrical shape with a diameter 500 μm are disposed at intervals of 500 μm.

In the above-described case, the electromotive force was 40 mV.

Eleventh Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 2.0 mm, and made of SUS304, depressed portions each having a cylindrical shape with a diameter 500 μm are disposed at intervals of 500 μm.

In the above-described case, the electromotive force was 20 mV.

In the eleventh example, though the acoustic matching layer is thinner than that in the tenth example, the ultrasonic wave reaching distance becomes remarkably shorter, and it is considered that this is because since the acoustic matching layer becomes thinner, the thickness is under ¼ of the wavelength of the propagated ultrasonic wave, so that the phases do not match each other.

Twelfth Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 2.8 mm, and made of a soda glass, depressed portions each having a cylindrical shape with a diameter 500 μm are disposed at intervals of 500 μm.

In the above-described case, the electromotive force was 40 mV.

Thirteenth Example

In the first exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 2.0 mm, and made of a soda glass, depressed portions each having a cylindrical shape with a diameter 500 μm are disposed at intervals of 500 μm.

In the above-described case, the electromotive force was 17 mV.

In the thirteenth example, though the acoustic matching layer is thinner than that in the twelfth example, the ultrasonic wave reaching distance becomes remarkably shorter, and it is considered that this is because since the acoustic matching layer becomes thinner, the thickness is under ¼ of the wavelength of the propagated ultrasonic wave, so that the phases do not match each other.

Fourteenth Example

In the third exemplary embodiment, evaluation of the electromotive force was performed as follows.

(1) An ultrasonic wave generation source has a circular shape with a diameter of 10 mm.

(2) As an acoustic matching layer, in a disk having a diameter of 10 mm and a thickness of 1.25 mm, and made of PEEK resin, depressed portions each having a cylindrical shape with a diameter 300 μm are disposed at intervals of 300 μm.

A film having a thickness 10 μm, and made of PEEK resin is pasted to a vibration surface as the film-shaped material.

In the above-described case, the electromotive force was 100 mV.

As compared with the first example, the electromotive force becomes larger, and it is considered that this is because the film-shaped material enables the exchange of the momentum to be efficiently performed in a place distant from the vibration surface in the depressed portion.

Comparative Example

In the first example, the electromotive force was evaluated, using a disk having a thickness of 1.25 mm, made of PEEK resin, and having no depressed portion as an acoustic matching layer.

In the above-described case, the electromotive force was 5 mV.

The electromotive force becomes remarkably smaller than that in the first example. This is because since no depressed portion exists in the acoustic matching layer, the acoustic impedance is the acoustic impedance of the PEEK resin, a difference from the acoustic impedance of the gas to transmit the ultrasonic wave to be large.

As described above, an acoustic matching layer in the first disclosure includes: a base material having a plate shape, and including a joining surface and a vibration surface which are opposite surfaces of the base material having a predetermined thickness, the joining surface being joined to an ultrasonic wave generation source, and the vibration surface emitting a sound wave; and portions partially provided in the vibration surface, the portions being depressed or penetrating toward the joining surface.

For example, the acoustic impedance of the piezoelectric element made of a ceramic and the acoustic impedance of the gas such as air or the like are remarkably different. Accordingly, it is difficult to propagate the sound wave generated from such an ultrasonic wave generation source to the gas with high efficiency.

Consequently, the acoustic matching layer having the acoustic impedance smaller than that of the piezoelectric element and larger than the gas enables the sound wave generated from the ultrasonic wave generation source to be propagated to the gas with high efficiency.

First, using the plate-shaped material as the base material, the one surface of this plate-shaped material is joined to the ultrasonic wave generation source, while the opposite surface of the plate-shaped material is the surface in contact to the gas, and is partially provided with the depressed portions or the penetrating portions. Here, since a part of the plate-shaped material has the depressed portions or the penetrating portions, the sound wave generated from the ultrasonic wave generation source is concentratedly propagated to the dense portion of the plate-shaped material. Accordingly, the density of a substance that can play a role of the propagation of the sound wave in a surface is a value obtained by multiplying a density inherent to the substance configuring the plate-shaped material by an abundance ratio of the dense portion. Furthermore, the sound velocity of the dense portion is a sound velocity inherent to the substance, and takes a value independent of the presence or absence of the depressed portions or the penetrating portions.

Accordingly, the acoustic impedance of the plate-shaped material having the depressed portions or the penetrating portions is a value obtained by multiplying the acoustic impedance inherent to the substance configuring the plate-shaped material by the abundance ratio of the dense portion. Furthermore, since the acoustic impedances of microscopic portions of the dense portion of the plate-shaped material and the gas are remarkably different, it is difficult to efficiently propagate the sound wave. However, since the gas has a viscous property, the sound wave is also propagated from the dense portion not only to the gas in contact to the dense portion but also to the gas near the depressed portions or the penetrating portions. Accordingly, an effect equivalent to an effect that a ratio between the acoustic impedance of the surface of the plate-shaped material in contact to the gas, and the acoustic impedance of the gas becomes relatively small can be obtained.

As described above, providing the depressed portions or the penetrating portions reduces the apparent acoustic impedance, and even in the case of a substance difficult to exhibit remarkable characteristics as the acoustic matching layer because of a large acoustic impedance, excellent characteristics as the acoustic matching layer can be obtained.

Accordingly, a substance such as a metal, a ceramic, or the like that has not been able to be used as the acoustic matching layer because of a large acoustic impedance though the substance has excellent characteristics such as heat resistance and the like is enabled to be used as the acoustic matching layer.

The acoustic matching layer in a second disclosure may be configured such that in the first disclosure, the base material is an array of a plurality of sheet-shaped materials, and each of the penetrating portions is a space between the sheet-shaped materials.

The acoustic matching layer in a third disclosure may be configured such that in the first disclosure, the base material is an array of a plurality of rod-shaped materials, each of the penetrating portions is a space between the rod-shaped materials.

The acoustic matching layer in a fourth disclosure may be configured such that in any one of the first to third disclosures, a scale of at least one of the portions is smaller than a wavelength of a propagated sound wave.

When the scale of the depressed portion or the penetrating portion is larger than the wavelength of the sound wave, the sound wave inside the acoustic matching layer scatters and the propagation is disturbed, and propagation efficiency is decreased. However, by making the scale of the depressed portion or the penetrating portion smaller than the wavelength of the propagated sound wave, remarkable decrease in the propagation efficiency can be prevented.

The acoustic matching layer in a fifth disclosure may be configured such that in the fourth disclosure, the scale of each of the portions is 1/10 or less of the wavelength of the propagated sound wave.

Generally, it is considered that when there is an obstacle on a propagation path of a wave, if the scale is almost equivalent to, or more than the wavelength, the disturbance of the propagation becomes remarkable, while if the scale is sufficiently smaller than the wavelength, the obstacle does not have a large influence on the propagation of the wave. Moreover, since the scale of the depressed portion or the penetrating portion is 1/10 or less than the wavelength of the sound wave, the influence on the propagation of the sound wave can be made smaller.

Accordingly, by making a distance between the depressed portions or between the penetrating portions each having the scale of 1/10 or less of the wavelength of the sound wave smaller, the acoustic impedance is made largely smaller to the acoustic impedance of the substance inherent to the material, and efficient propagation of the sound wave can be assured.

The acoustic matching layer in a sixth disclosure may be configured such that in any one of the first to fifth disclosures, at least a part of the base material is a resin.

At least a part of the material is a resin, and this makes molding by machining easy. That is, in order to provide the depressed portions or the penetrating portions in a part of the material, formation of holes by a drill or the like is common. Accordingly, machining can be applied to even the depressed portion or the penetrating portion of about 0.1 mm, which is considered to be required in the case where the wavelength of the ultrasonic wave is about several mm.

The acoustic matching layer in a seventh disclosure may be configured such that in any one of the first to fifth disclosures, at least a part of the base material is a ceramic or glass.

As a characteristic of a ceramic or glass, an excellent heat resistance can be cited. Accordingly, this acoustic matching layer can be used at high temperatures, such as exhaust gas measurement of an automobile, or the like.

The acoustic matching layer in an eighth disclosure may be configured such that in any one of the first to fifth disclosures, at least a part of the base material is a metal.

As characteristics of a metal, excellent heat resistance and impact resistance can be cited. Accordingly, this acoustic matching layer can be used at high temperatures, such as exhaust gas measurement of an automobile, or the like.

The acoustic matching layer in a ninth disclosure may be configured such that in any one of the first to eighth disclosures, a film-shaped material is installed in the vibration surface.

The surface where the film-shaped material is installed is a surface in contact with the gas, and this can bring about the more excellent characteristics of the acoustic matching layer.

In the case where the film-shaped material is not installed, when the sound wave propagated in the dense portion of the plate-shaped material is propagated to the gas portion, the sound wave is also transmitted to the gas near the depressed portions or the penetrating portions by the viscous property of the gas. However, when the viscous property of the gas is small, or when an area of the depressed portion or the penetrating portion is larger, the propagation of the sound wave of the gas at a position distant from the dense portion in the depressed portion or the penetrating portion is not sufficient.

On the other hand, when the film-shaped material is installed, the film-shaped material vibrates in a direction parallel to a propagation direction of the sound wave, and thereby, if the area of the depressed portion or the penetrating portion is large, that is, the sound wave can also be propagated to the gas existing at the position distant from the dense portion, so that excellent characteristics as the acoustic matching layer can be obtained.

INDUSTRIAL APPLICABILITY

As described above, for the acoustic matching layer according to the present invention, a material excellent in heat resistance such as a metal or a ceramic, or the like can be used. Accordingly, since an automobile, power generation, a heat engine of an aircraft, or the like is required for durability to high temperature, the present invention can be also applied to a field where application has conventionally been difficult.

REFERENCE MARKS IN THE DRAWINGS

1: acoustic matching layer
2: dense portion
3, 3*c*, 3*b*, 3*f*: depressed portion
3*a*, 9*a*: through hole (penetrating portion)
3*d*, 3*e*: penetrating portion
4: ultrasonic wave generation source
5, 8*a*, 9*b*: joining surface
6, 6*a*: vibration surface
7: film-shaped material

The invention claimed is:

1. An acoustic matching layer comprising:

a base material having a plate shape, and including a joining surface and a vibration surface which are opposite surfaces of the base material having a predetermined thickness, the joining surface being joined to an ultrasonic wave generation source, and the vibration surface being configured to emit a sound wave to a gas;

portions partially provided in the vibration surface, the portions being depressed or penetrating toward the joining surface; and a film-shaped material completely covering the portions, the film-shaped material being installed in the vibration surface so as to be in contact with the gas.

2. The acoustic matching layer according to claim 1, wherein:

the base material is an array of a plurality of sheet-shaped materials; and each of the portions is a space between the sheet-shaped materials.

3. The acoustic matching layer according to claim 1, wherein:

the base material is an array of a plurality of rod-shaped materials; and each of the portions is a space between the rod-shaped materials.

4. The acoustic matching layer according to claim 1, wherein a scale of at least one of the portions is smaller than a wavelength of the sound wave which has propagated.

5. The acoustic matching layer according to claim 4, wherein the scale of the at least one of the portions is $1/10$ or less of the wavelength of the sound wave which has propagated.

6. The acoustic matching layer according to claim 1, wherein at least a part of the base material is a resin.

7. The acoustic matching layer according to claim 1, wherein at least a part of the base material is a ceramic.

8. The acoustic matching layer according to claim 1, wherein at least a part of the base material is a metal.

9. The acoustic matching layer according to claim 1, wherein at least a part of the base material is glass.

* * * * *